US009593504B2

United States Patent
Marinovic et al.

(10) Patent No.: US 9,593,504 B2
(45) Date of Patent: *Mar. 14, 2017

(54) BUCKLING RESTRAINED BRACE ASSEMBLY

(71) Applicant: BlueScope Buildings North America, Inc., Kansas City, MO (US)

(72) Inventors: Igor Marinovic, Germantown, TN (US); Clifton D. Hyder, Collierville, TN (US)

(73) Assignee: Bluescope Buildings North America, Inc., Kansas City, MO (US)

( * ) Notice: Subject to any disclaimer, the term of this patent is extended or adjusted under 35 U.S.C. 154(b) by 138 days.

This patent is subject to a terminal disclaimer.

(21) Appl. No.: 14/667,181

(22) Filed: Mar. 24, 2015

(65) Prior Publication Data

US 2015/0197954 A1    Jul. 16, 2015

Related U.S. Application Data

(63) Continuation-in-part of application No. 14/019,107, filed on Sep. 5, 2013, now Pat. No. 9,016,007.

(Continued)

(51) Int. Cl.
*E04H 9/02* (2006.01)
*E04C 3/06* (2006.01)
(Continued)

(52) U.S. Cl.
CPC ............ *E04H 9/021* (2013.01); *B23K 31/02* (2013.01); *E04B 2103/06* (2013.01); *E04C 3/06* (2013.01); *E04C 2003/0413* (2013.01); *E04C 2003/0452* (2013.01); *E04C 2003/0478* (2013.01); *E04H 9/028* (2013.01)

(58) Field of Classification Search
CPC ......... E04H 9/021; E04H 9/028; E04H 9/024; E04H 9/02; E04H 9/00; E04H 9/022; F16F 7/003; F16F 7/08; F16F 7/12
See application file for complete search history.

(56) References Cited

U.S. PATENT DOCUMENTS

| 6,837,010 B2 * | 1/2005 | Powell | E04H 9/02 403/174 |
| 6,840,017 B1 * | 1/2005 | Shimoda | E04H 9/02 52/1 |

(Continued)

FOREIGN PATENT DOCUMENTS

| JP | 03247870 A | 11/1991 |
| JP | 03262881 A | 11/1991 |

(Continued)

OTHER PUBLICATIONS

Canadian Patent Application No. 2,884,090 Office Action dated Nov. 16, 2015, 2 pages.

(Continued)

*Primary Examiner* — Phi A
(74) *Attorney, Agent, or Firm* — Lathrop & Gage L.L.P.

(57) ABSTRACT

The disclosed subject matter is directed to a building structural bracing apparatus having an inner core element disposed between an upper and a lower containment web. The brace frame being useful in the construction of earthquake and blast resistant structures where energy dissipation is desired.

31 Claims, 10 Drawing Sheets

Related U.S. Application Data (60) Provisional application No. 61/697,646, filed on Sep. 6, 2012.

(51) Int. Cl.
*B23K 31/02* (2006.01)
*E04C 3/04* (2006.01)

(56) References Cited

U.S. PATENT DOCUMENTS

| | | | | |
|---|---|---|---|---|
| 7,076,926 | B2 * | 7/2006 | Kasai | E04H 9/02 52/167.1 |
| 7,174,680 | B2 * | 2/2007 | Smelser | E04C 3/02 52/167.1 |
| 7,185,462 | B1 * | 3/2007 | Smelser | E04H 9/02 52/167.1 |
| 7,225,588 | B2 * | 6/2007 | Nakamura | F16F 7/00 52/167.1 |
| 7,284,358 | B2 * | 10/2007 | Smelser | E04C 3/02 264/221 |
| 7,305,799 | B2 * | 12/2007 | Smelser | E04C 3/02 52/167.1 |
| 7,461,481 | B2 | 12/2008 | Tsai | |
| 8,001,734 | B2 * | 8/2011 | Pryor | E04B 1/2403 52/167.3 |
| 8,365,476 | B2 * | 2/2013 | Richard | E04B 1/24 52/167.1 |
| 2007/0006538 | A1 | 1/2007 | Chuang | |
| 2009/0211180 | A1 | 8/2009 | Smelser | |
| 2010/0319274 | A1 | 12/2010 | Tsai | |
| 2013/0283709 | A1 | 10/2013 | Christopoulos et al. | |
| 2014/0059950 | A1 | 3/2014 | Marinovic et al. | |

FOREIGN PATENT DOCUMENTS

| | | |
|---|---|---|
| JP | 05071242 A | 3/1993 |
| JP | 06212833 A | 8/1994 |
| JP | 06071602 U | 10/1994 |
| JP | 11159010 A | 6/1999 |
| JP | 2001214541 A | 8/2001 |
| JP | 4771136 B2 | 9/2011 |

OTHER PUBLICATIONS

PCT Application PCT/US2013/058523 International Search Report and Written Opinion, Dec. 17, 2013, 17 pages.

PCT Application PCT/US2013/058523 Article 19 Amendments, Feb. 17, 2014, 19 pages.

Canadian Patent Application 2,884,090 Notice of Allowance dated Feb. 5, 2016, 1 page.

* cited by examiner

BUCKLING RESTRAINED BRACE ASSEMBLY

CROSS-REFERENCE TO RELATED APPLICATIONS

This application is a continuation-in-part of U.S. application Ser. No. 14/019,107 filed on Sep. 5, 2013, which claims benefit of U.S. Provisional Patent Application No. 61/697,646, filed Sep. 6, 2012, the disclosures of which are incorporated herein by reference.

BACKGROUND

Field of the Invention

The disclosed subject matter is directed to a bracing apparatus having a steel inner core element and the methods for fabrication of same. The present invention is useful in the construction of earthquake and blast resistant structures where energy dissipation is desired.

Description of the Related Art

Braced frames are commonly used in buildings and other structures to provide strength and stability against lateral forces induced by wind, earthquake, or other sources. Braced frames are also effective solution for limiting lateral displacement of building stories. Regardless of the arrangement of braces in braced frames (diagonal, chevron, etc.), the overall strength and stability of the lateral-force resisting system depends mainly on the performance of the structural braces. The buckling restrained brace frame (BRBF) is a highly ductile seismic-force resisting system intended primarily for special seismic applications. The principal advantage of the buckling restrained brace is that the brace does not buckle, so the brace strength is similar under compression and tension loading, which results in more economical use of framing members especially when compared to special concentric braced frames (SCBF). This is accomplished by attempting to decouple axial stresses from flexural buckling such that an inner steel core transfers axial load while the outer encasing buckling-restraining mechanism prevents global buckling and forces the core plate into local high-mode buckling. The preclusion of buckling in a restrained brace results in hysteretic behavior that is similar under both compression and tension loading. Another advantage of the buckling restrained brace frame is that the brace connections are relatively small and compact in comparison to the connections or special concentric braced frames.

SUMMARY

Flat steel plates and/or bar materials are used to create a unique configuration that is comprised of a yielding steel core fabricated from steel plate or bar as the load resisting element. The yielding steel core is confined against buckling between steel web plates welded to two steel flange plates in an "I" shape configuration. To limit the deformation of the steel core the web plates are placed in close proximity to the steel core, with only a very nominal gap provided by natural unevenness of the steel material. Additional friction reducing material, a liner or a thin coating may be applied to the steel core contact surfaces and to the surrounding web members to reduce friction and facilitate movement of the steel core Specialized manufacturing equipment is utilized including automatic computerized plate cutting technology and automatic submerged arc welding equipment to effectively fabricate the brace. With the exception of a small weld or bolt located at mid-length to secure the core to the webs, the yielding steel core is not connected directly to the restraining elements in order to allow for independent movement of the load resisting core relative to the restraining brace elements.

The state of the art buckling restrained braces (BRB) currently available are designed primarily for high rise buildings and other structures where large lateral loads are involved, most commonly to resist lateral earthquake loads. The technology disclosed herein differs from conventional buckling-restrained braces in that it is lighter, more economical, and is designed primarily for low rise structures where generated lateral loads are lower than conventional state of the art braces can economically accommodate, yet more economical than comparable prescriptive building code solutions.

Current state of the art buckling-restrained braces utilize conventional hot roll shapes, usually HSS tubes or pipe filled with mortar, concrete, or other non-compressible filler material to restrain the load resisting steel core against buckling. The primary difference between this invention and conventional buckling restrained braces is that the entire brace is made from steel elements only, welded in a specific configuration to allow the steel core to be continuously restrained by, yet move independent of, the restraining steel elements.

When conventional structural braces are subject to high axial forces the braces may reach various forms of local and global buckling that can lead to reduced strength and stiffness, and degraded performance, even collapse, especially under cyclic loading resulting from an earthquake. In contrast to conventional braces, the buckling-restrained brace exhibits stable and predictable behavior under cyclic loading. With these braces the impact of an earthquake can be absorbed or reduced, and the frame lateral displacement reduced to an acceptable level. The principle difference is in the unique arrangement of elements of the buckling-restrained brace assembly that will allow plastic deformation of its inner core while at the same time prevent buckling within the member or its end connections. Consequently, the continuously braced inner core element will elongate or compress during loading cycles and the brace will achieve nearly equal strength and stiffness under axial compression and tension loading.

To assure the above described behavior, the brace assembly must allow for free movement of the inner core with respect to the restraining apparatus along the brace length. This relative movement can be facilitated with a variety of friction reducing materials or coatings, or an air-gap.

DETAILED DESCRIPTION

Figures 1, 2:
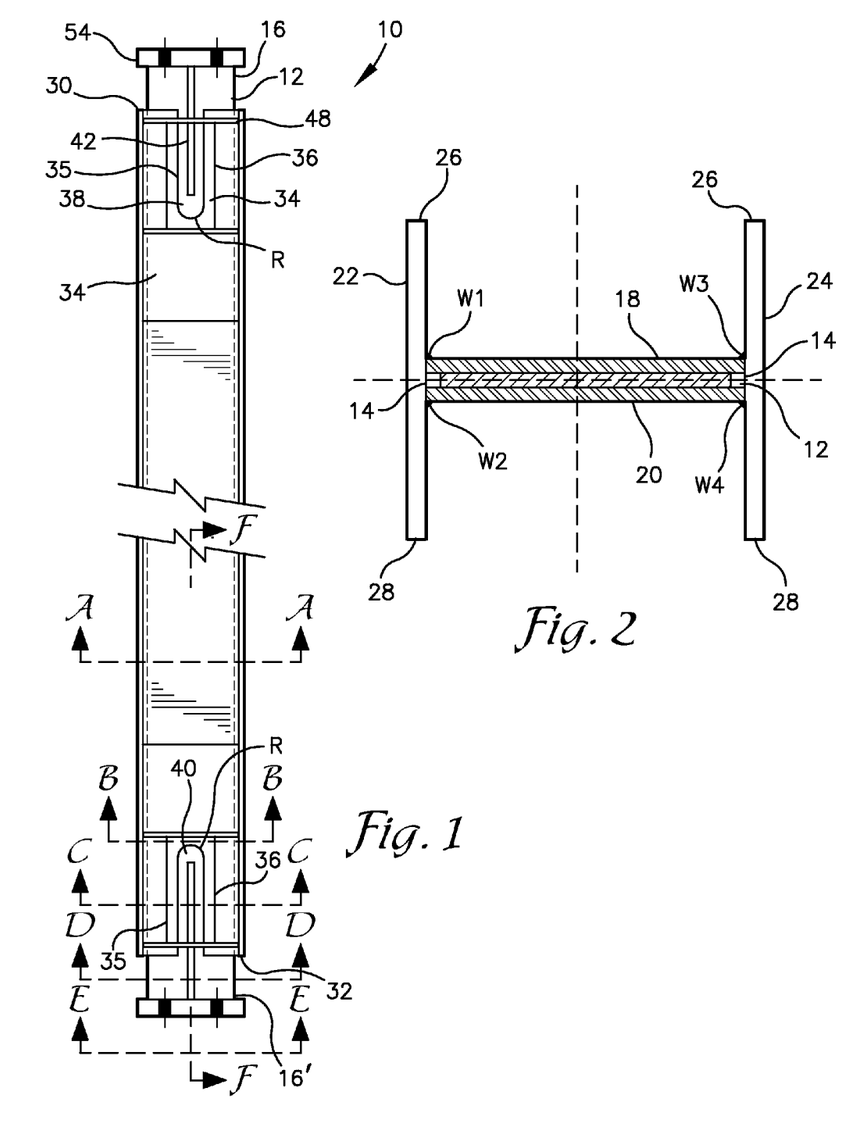
FIG. 1 is a plan view of an embodiment of a brace with section views along lines A-A through F-F.
FIG. 2 is a cross sectional view along line A-A of FIG. 1 of an embodiment of the brace.

Referring now to the drawings wherein like reference numerals refer to similar or identical parts throughout the several views. FIG. 1 reveals a plan view of the brace assembly 10. As seen in FIGS. 1 and 2, the brace 10 is constructed with a core 12 with lateral edges 14, 14' and longitudinal ends 16, 16' sandwiched between an upper web 18 and a lower web 20. The core 12 and the upper and lower web 18, 20 are positioned perpendicularly, at approximately the centerline CL of the two parallel and opposed flanges 22, 24 with each flange having an upper edge 26 and a lower edge 28 and first and second longitudinal ends 30, 32. The upper and lower webs 18, 20 are secured to the parallel opposed flanges at weld lines W1, W2, W3 and W4.

Figure 12:
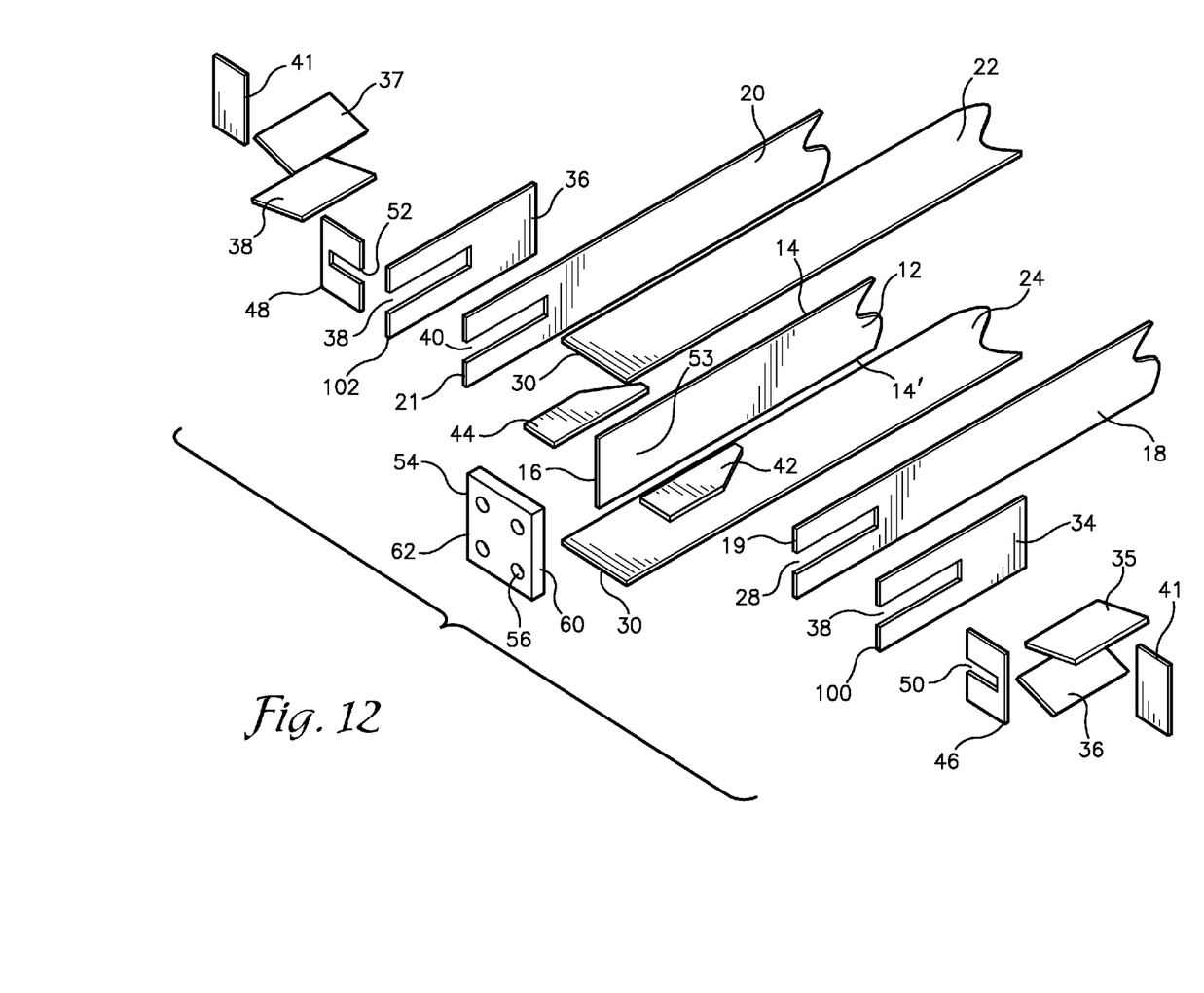
FIG. 12 is an exploded perspective view of an embodiment of one end of the brace.

Both the upper web 18 and the lower web 20 each contain one small opening located approximately mid-length between longitudinal ends 16, 16' and equal distance between lateral edges 14, 14' where a short weld is placed along the edge of the opening to secure the steel core to the restraining webs 18, 20 (not depicted in FIG. 1). This is the only place where the steel core 12 is connected to either of the webs 18, 20. Also depicted in FIG. 1 are cutouts 38, 40 at the longitudinal ends 39 of the upper web 18. The cutouts 38, 40 facilitate the placement of the core stiffeners 42, 44 to the steel core 12. As depicted in FIG. 12, the cutouts 38, 40 are fabricated into the longitudinal ends 19, 21 of both of the upper and lower webs 18, 20.

Figure 3:
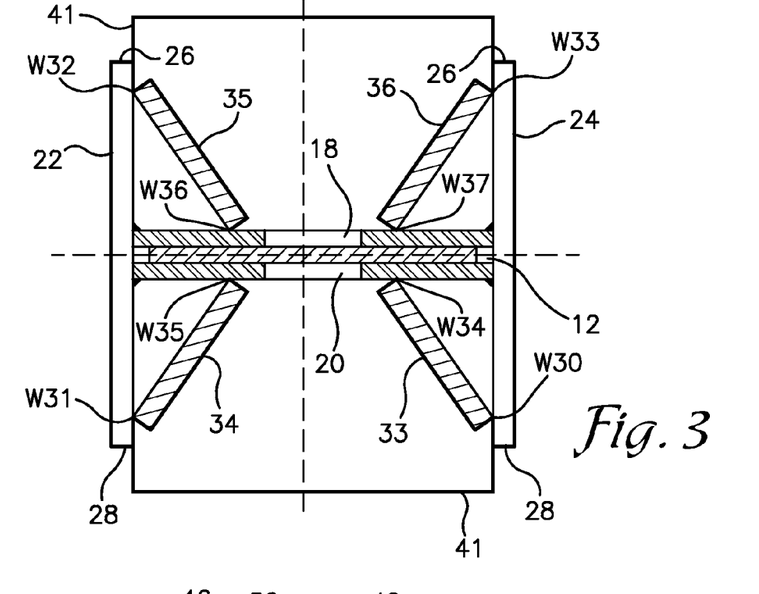
FIG. 3 is a cross sectional view along line B-B of FIG. 1 of an embodiment of the brace.

As seen in FIG. 3 and positioned atop the upper and lower webs 18, 20 are slope stiffeners 33, 34, 35, 36 that restrain the free longitudinal edge of the web slot 38, 40 against deformation when a large load is applied to the core 12. The web slots 38, 40 also preferably terminate in a radius 'R' at the interior end of each slot 38, 40. Utilizing a radius, as opposed to an orthogonal edge, at the end of the slot reduces the potential for the corners of the web slots 38, 40 to serve as a high friction point for the core 12 when under heavy load and particularly when subject to a load reversal. The radius serves to prevent the corner of the web plates 18, 20 from weakening the core by scoring and removing core material. As seen in FIG. 3, the slope stiffeners 35, 36 are placed at an angle and have a first longitudinal edge welded to the upper web 18 at weld lines W36-W37 and a second longitudinal edge welded respectively to the two opposed flanges 22, 24 at weld lines W32-W33. Slope stiffeners 33, 34 have a first longitudinal edge welded to the lower web 20 at weld lines W34-W35 and a second longitudinal edge welded to the two opposed flanges 22, 24 at weld lines W30-W31.

The slope stiffeners 33, 34, 35, 36 also have lateral edges that are welded to the upper and lower U-stiffeners 46, 46 and to the end stiffeners 41. The angle of inclination of the slope stiffeners 33, 34, 35, 36 is preferably in the range of 35 to 50 degrees relative to the first and second flanges 22, 24. The slope stiffeners are preferably fabricated from Grade 55 Carbon steel or alternatively steel with comparable strength characteristics.

Figure 4:
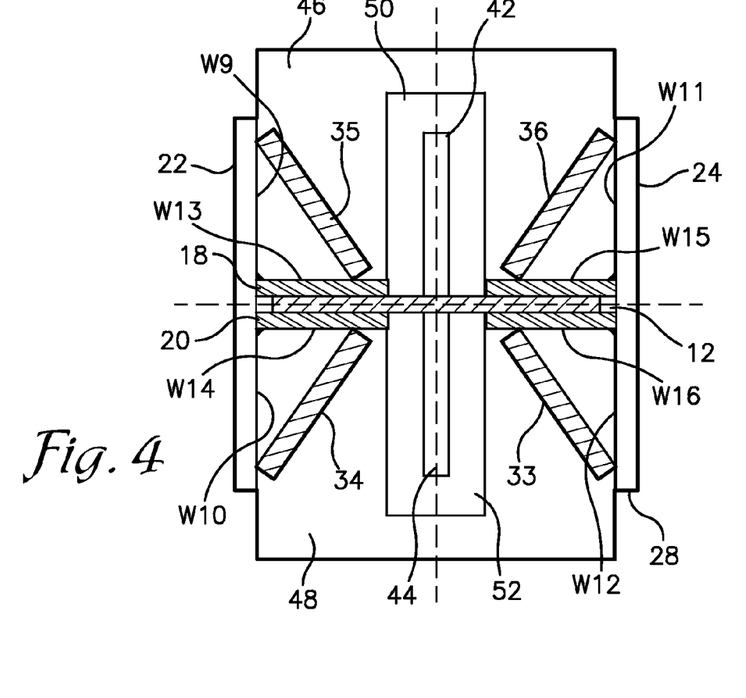
FIG. 4 is a cross sectional view along line C-C of FIG. 1 of an embodiment of the brace.

FIG. 4 is a view of the brace 10 at section C-C of FIG. 1 and reveals the installation of U-stiffeners 46, 48. The U-stiffeners are preferably fabricated from plate steel and are positioned atop the webs 18, 20 and span between the opposed flanges 22, 24. The U-stiffeners 46, 48 are welded to the opposed flanges 22, 24 along weld lines W9, W10, W11 and W12 as well as along weld lines W13, W14, W15, W16 to the webs 18, 20 to increase the structural rigidity of the brace 10. The U-stiffeners 46, 48 are fabricated with a cutout 50, 52 through which the core stiffeners 42, 44 pass. The U-stiffeners 46, 48 height may extend above the lateral edges 26, 28 of the flanges 22, 24; however, the precise configuration of the U-Docket stiffeners will be dictated by the anticipated loading and spatial constraints, such as the core stiffener 42, 44 dimensions.

Figure 5:
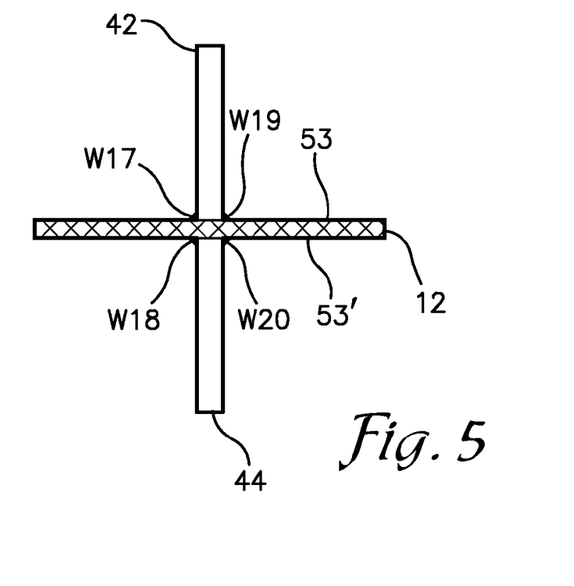
FIG. 5 is a cross sectional view along line D-D of FIG. 1 of an embodiment of the brace.

FIG. 5 is a view of the brace 10 at section D-D of FIG. 1. In addition, FIG. 5 reveals the core stiffeners 42, 44 welded to the upper 53 and lower surface 53' of the core 12. The length of the core stiffeners 42, 44 will depend upon various design considerations. The core stiffeners 42, 46 are welded to the core 12 along their entire lengths at weld lines W17, W18, W19 and W20; however, the core stiffeners only extend along a truncated portion of the entire length of the core 12 in the areas cutout 38, 40 from the webs 18, 20.

Figure 6:
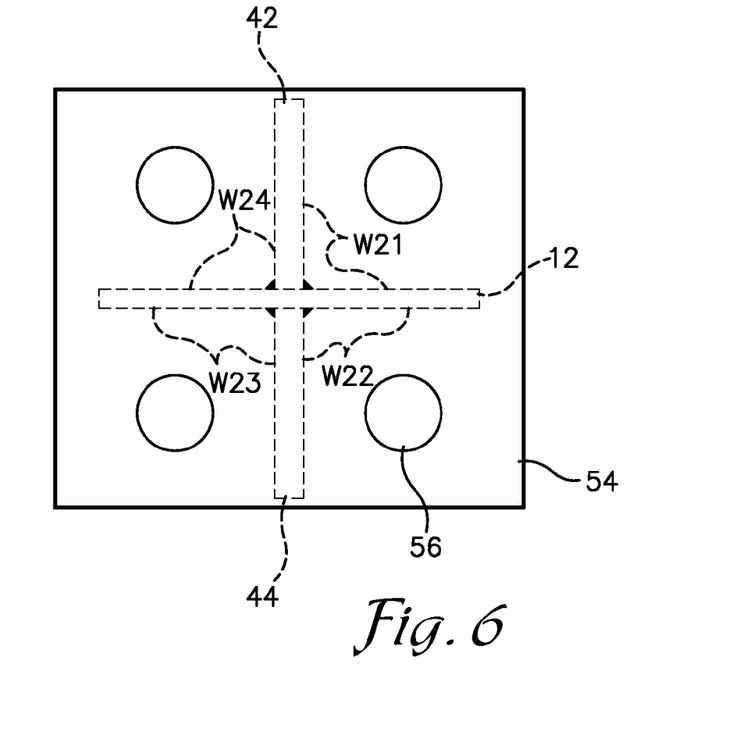
FIG. 6 is a cross sectional/elevational view along line E-E of FIG. 1 of an embodiment of a brace end-plate.

FIG. 6 is an elevation view of the brace 10 at section E-E of FIG. 1. FIG. 6 reveals an end plate 54 with phantom lines detailing the connection to the steel core 12 and the core stiffeners 42, 44 on the backside of the end plate. The end plate 54 is preferably welded to the steel core 12 and core stiffeners 42, 44 at weld lines W21, W22, W23 and W24 which extend up each edge of the core 12 and the core stiffeners. The end plate 54 includes a plurality of holes 56, to secure the end plate 54 and brace 10 to a gusset plate as will be discussed in greater detail below. The end plate 54 is preferably fabricated from steel plate and is of sufficient thickness to withstand all required loads. Multiple embodiments of the end plate 54 are contemplated to include 4 or more holes 56 and a wide array of shapes to accommodate the end user.

Figure 7:
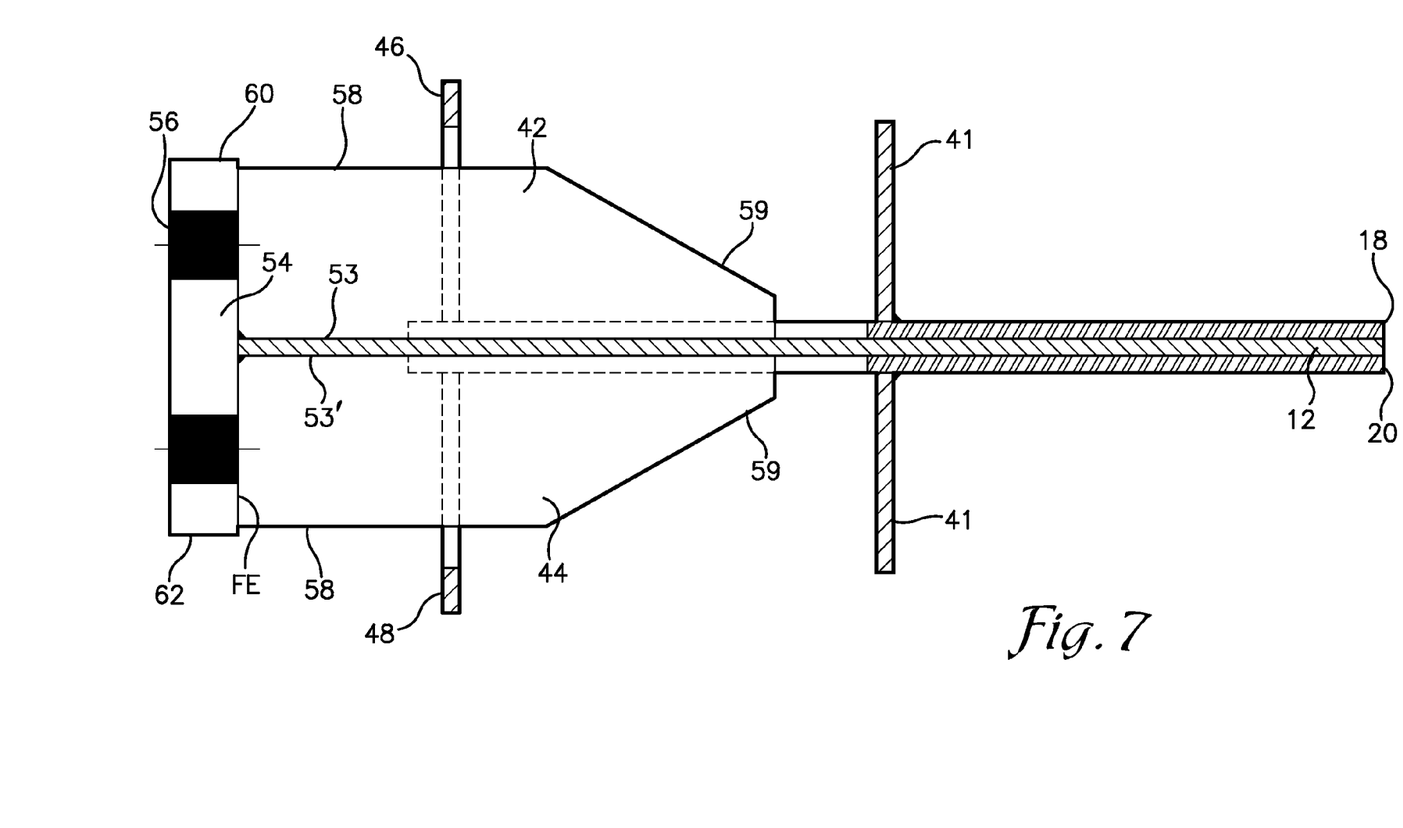
FIG. 7 is a cross sectional view along line F-F of FIG. 1 of an embodiment of one end of the brace configured for bolted attachment to a gusset plate.

FIG. 7 is a cross-sectional view of one end of the brace 10 at section F-F revealing a longitudinal cross section of the brace. The configuration shown in FIG. 7 is utilized for bolting, as opposed to welding, of the brace to a gusset plate as will be more fully detailed below during the discussion of FIG. 10. FIG. 7 reveals the steel core 12 sandwiched between the upper and lower webs 18, 20. As previously discussed, the upper and lower webs 18, 20 are welded to the two opposing flanges 22, 24; however, the core 12 is not welded to the flanges. As previously discussed, the mid-span of the core 12 is welded to the upper and lower webs 18, 20 at a cutout (not shown) to maintain an even displacement of the core extending outwardly from each end of the brace 10. FIG. 7 also reveals the attachment of the core stiffeners 42, 44 to the upper and lower surfaces 53, 53' of the core 12 as well as the placement of forward and rear upper U-stiffener 46 and forward and rear lower U-stiffener 48. The U-stiffeners are in position over the upper and lower webs 18, 20. The end stiffener 41 is in position immediately behind the cutouts 38, 40 and is welded to the first and second flanges 18, 20 as well as webs 18, 20. The end stiffener 41 serves to enhance the structural rigidity of the brace 10 in the vicinity of the cutout since the area of the cutout 38, 40 is missing the steel plate that has been removed from covering the core 12. The slope stiffeners 33-36 (not shown in FIG. 7) are located between U-stiffeners 46, 48, and slot end stiffeners 41, with their short edges welded to U-stiffeners 46, 48 and to slot end stiffeners 41.

The embodiment of the core stiffeners 42, 44 depicted in FIG. 7 utilizes an edge with a portion 58 that is parallel to the core 12 and a portion 59 that is sloped; however, other configurations are also permissible Likewise, the upper core stiffener 42 as depicted in FIG. 7 extends vertically to roughly the upper surface 60 of the endplate 54 and on the lower surface the core stiffener 44 extends vertically downward to the lower edge 62 of the endplate 54. The greater the elevation of the core stiffeners 42, 44 results in a greater welded line of contact with the endplate 54—welds W21, W22, W23, and W24, as shown in FIG. 6.

Figure 8:
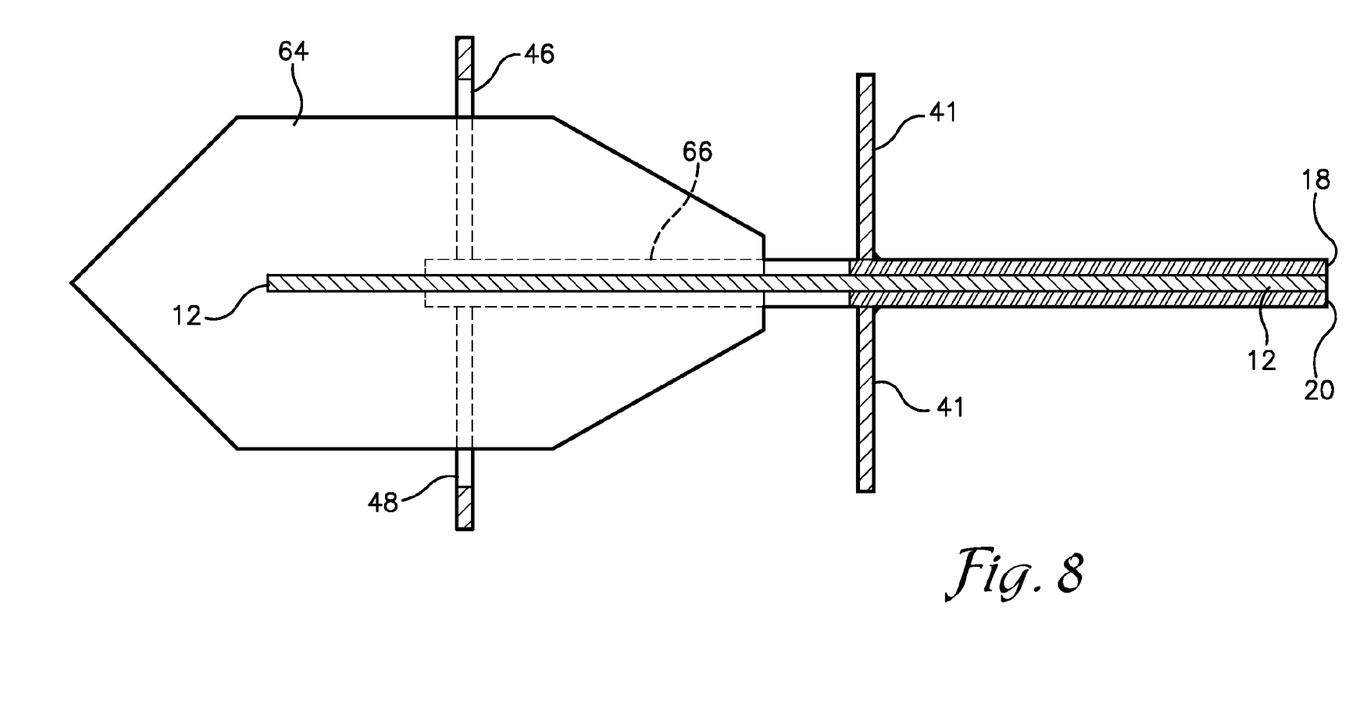
FIG. 8 is a cross sectional view of an embodiment of one end of the brace configured for welded attachment to a gusset plate.
Figure 11:
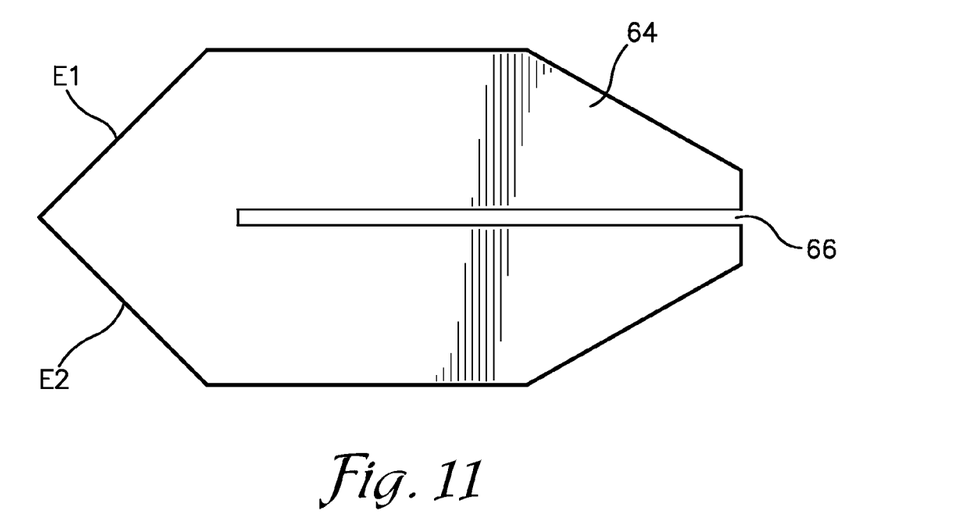
FIG. 11 is an elevation view of an embodiment of a slotted core stiffener that is utilized for a welded connection to a structure.

FIG. 8 reveals an alternative configuration of the brace 10 to that shown in FIG. 7. As previously discussed, FIG. 7 depicts a configuration of the brace 10 for bolting of the brace to a gusset. FIG. 8 reveals a configuration suited for direct welding of the brace 10 to frame members. Instead of an endplate 54, the configuration depicted in FIG. 8 utilizes an enlarged core stiffener 64 with a slit 66. FIG. 11 reveals a stand-alone configuration of the core stiffener 64 detailing the slit 66 that extends a substantial portion through the stiffener. To accommodate larger connection design forces or brace angles other than 45 degrees the core stiffener 64 size and shape may be modified as needed. Additionally, the core stiffener 64 can be modified to accommodate bolted shear connection to the frame members (not depicted in FIG. 8). During fabrication, the stiffener 64 is slid over the core 12 and when in position the stiffener 64 is welded to the core 12 along the four lines created by intersection of the slit 66 and the core 12. As with other configurations, the embodiment shown in FIG. 8 includes the upper and lower webs 18, 20, U-stiffeners 46, 48, slot stiffeners 41, and slope stiffeners 33-36 (not shown). The implementation of the embodiment detailed in FIG. 8 will be described in greater detail below during the discussion of FIG. 14.

Figure 9:
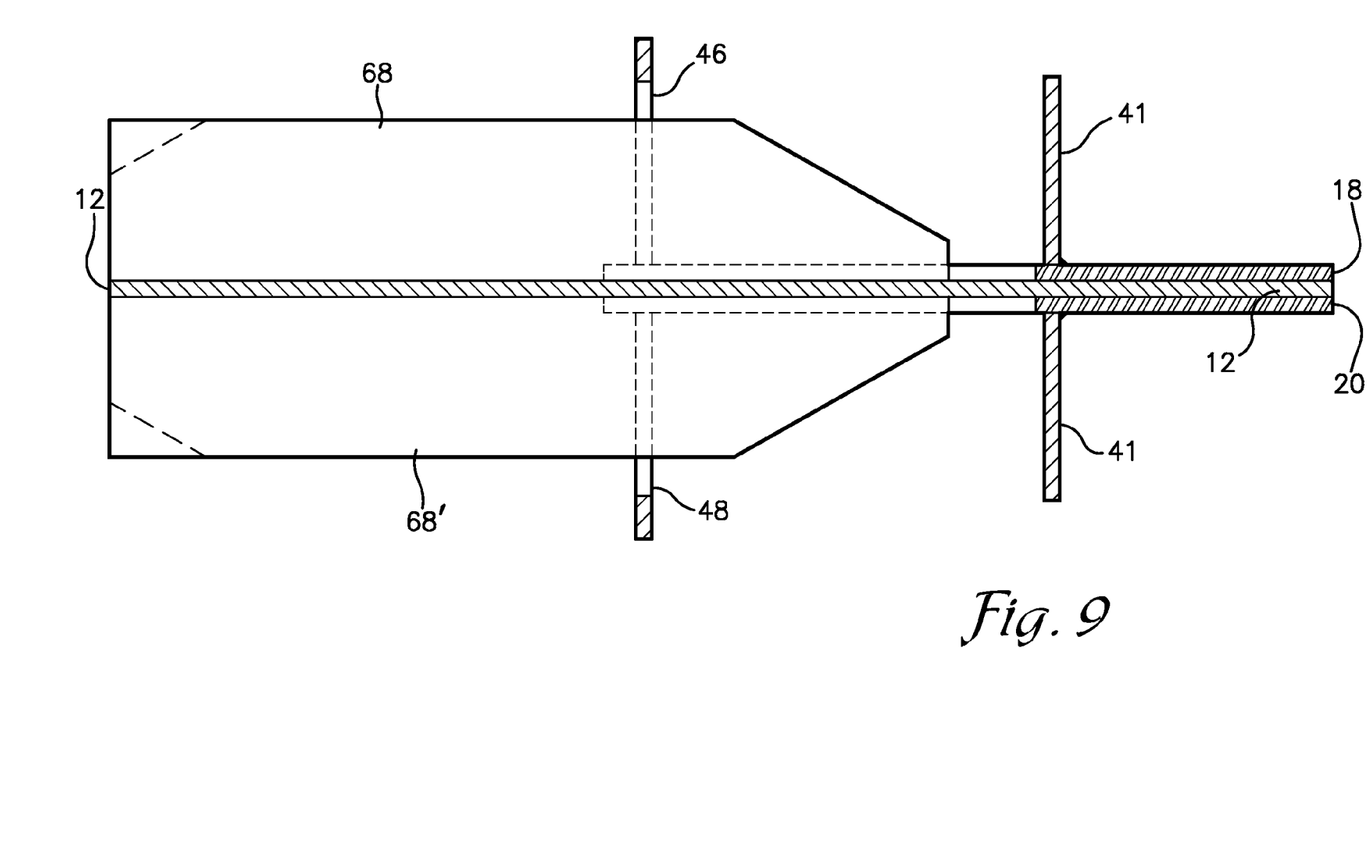
FIG. 9 is a cross sectional view of an embodiment of one end of the brace configured for welded attachment to the building frame.

FIG. 9 reveals a second alternative configuration of the brace 10 utilizing a pair of extended core stiffeners 68, 68'. The extended core stiffener embodiment is configured for field welding of the stiffeners 68, 68' to a gusset with a diagonal slot. All other aspects of the extended core stiffener embodiment including the webs, flanges, U-stiffeners, the slot end stiffeners, and the slope stiffeners are the same as in the previous embodiment shown in FIG. 8, and are all subject to variations in design to accommodate the expected loads and to satisfy space constraints that exist in the construction of framed structures.

Figure 10:
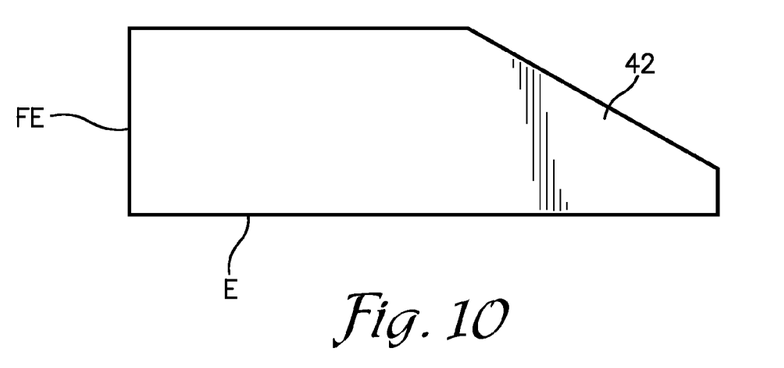
FIG. 10 is an elevation view of an embodiment of a core stiffener.

FIG. 10 reveals a core stiffener 42 used in the bolted configuration. Four separate stiffeners 42 are welded to the steel core 12 at four separate locations on the upper and lower surfaces 53, 53' of the core. The stiffeners 42 are welded to the core upper and lower surfaces 53, 53' along both sides on the bottom edge 'E' of the stiffener. Specifically, a core stiffener is positioned atop the upper and lower surfaces of the core 53, 53' and the stiffener resides within the cutouts 38, 40 formed within the webs 18, 20. The forward edge 'FE' of the stiffener, as shown in FIGS. 7 and 10 is preferably welded to the end plate 54. Although FIG. 10 details a specific configuration of the stiffener it is understood that numerous configurations of a core stiffener will satisfy the structural requirements associated with the use of the brace 10 and that no particular configuration is necessarily optimal considering the differing loads and size constraints that exist from one building to the next.

FIG. 11 has previously been described and reveals an embodiment of a core stiffener 64 used in a brace 10 as configured in FIG. 8. The core stiffener 64 utilizes a slit 66 that slides over the end of the core and is then welded in position along lines at W17-W20 as seen in FIG. 5. The edges at E1 and E2, as seen in FIG. 14 are then field welded to the frame members.

FIG. 12 is an exploded view of the bolted connection embodiment of the brace 10 detailing the components utilized in the fabrication of the brace. It is to be understood that the brace depicted in not only FIG. 12 but in all other figures within the specification include a second end with connection elements (bolted or welded) as shown with the first end. The end stiffeners 41 do not include a cutout as seen with cutouts 50, 52 on the U-stiffeners 46, 48.

Figure 13:
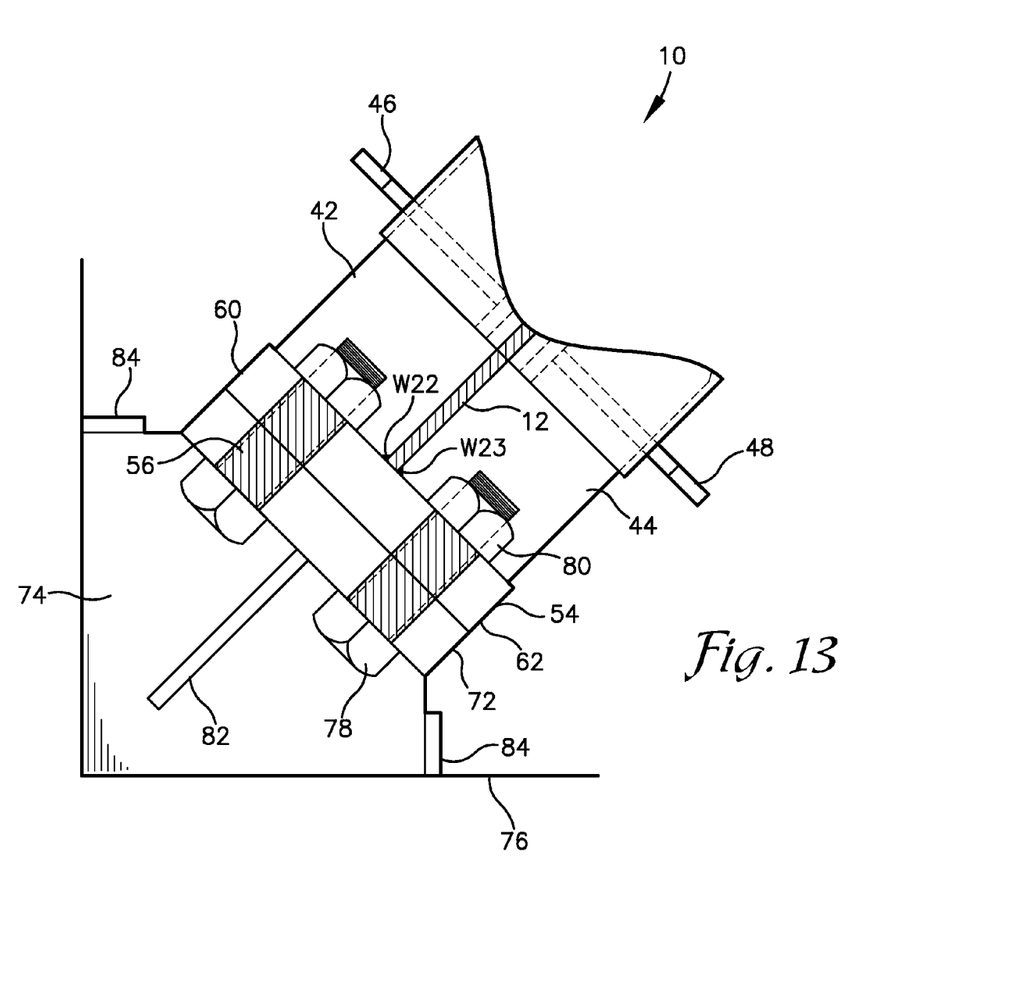
FIG. 13 is an elevation view of an embodiment of the brace configured for a bolted attachment to a gusset plate.

FIG. 13 depicts a bolted end-plate connection of the brace 10. The endplate 54 of the brace is positioned against an endplate 72 that is secured, preferably by welding, to a gusset 74 at the intersection of horizontal and vertical structural members within a building frame 76. The brace endplate 54 and the building endplate 72 have comparably oriented and sized holes through which bolts 78 are passed and secured in position with nuts 80. FIG. 13 shows the brace orientation where the steel core 12 is perpendicular to the building frame gusset 74. An alternative configuration is available where the core 12 is laid atop the building frame gusset 74, while two core stiffeners 42, 44 are coplanar with the gusset stiffeners 82 (not depicted in FIG. 13). The building endplate 72 is secured to a gusset 74 that is itself reinforced with a gusset stiffener 82 that extends diagonally across the gusset plate and serves to limit flexing and deformation of the gusset plate 74 when large loads are applied to the structure. To further enhance the capacity of the building frame to withstand large loads, as seen in FIG. 13, edge stiffeners 84 are secured, typically by welding, to the gusset 74 and the structure 76 at the corners of the gusset. The edge stiffeners 84 are short plates that span across the gusset 74 and are welded to the gusset and the frame 76.

Figure 14:
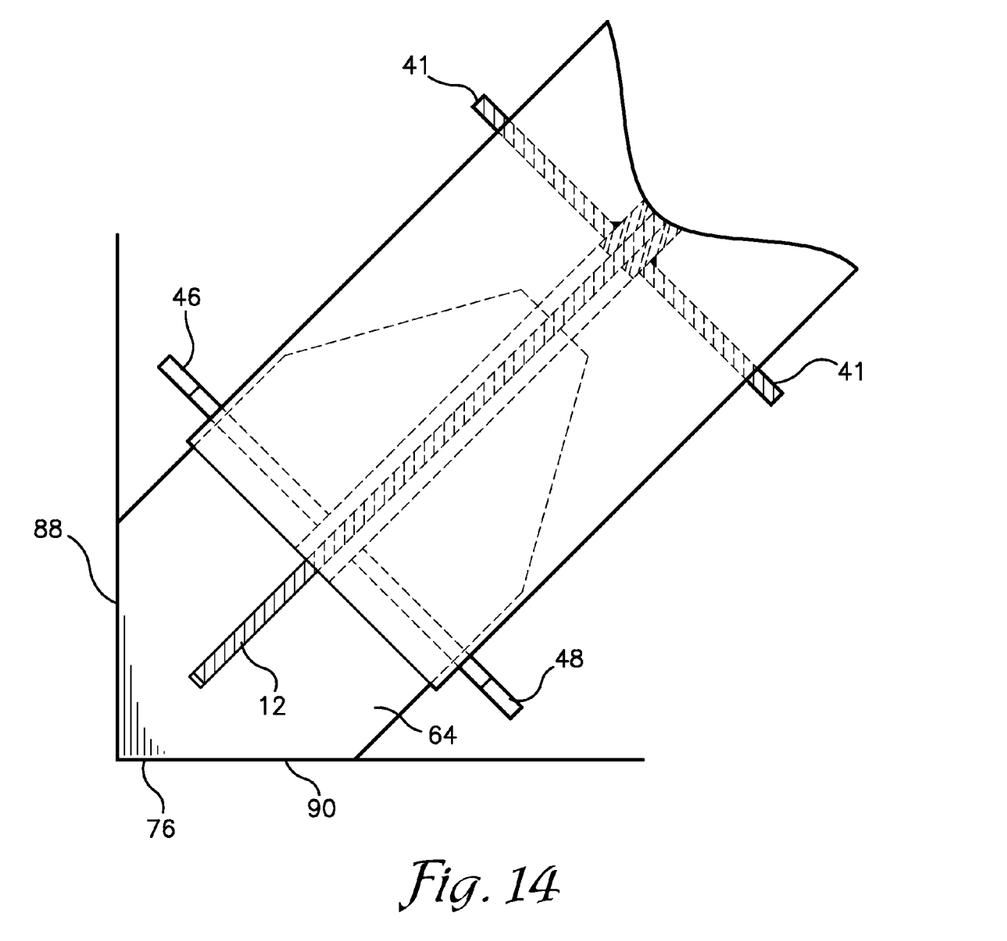
FIG. 14 is an elevation view of an embodiment of the brace configured for a field welded connection to a gusset plate.

FIG. 14 depicts a field welded connection of the brace 10 to the building frame 76. The edges 88, 90 of the core stiffener 64 are field welded to the frame 76 of the building thereby solidly anchoring the brace 10 in position. It is understood that the brace 10 will be field welded at both ends, the opposite end having an identical configuration, in order for the brace to properly function.

Those skilled in the art appreciate that variations from the specified embodiments disclosed above are contemplated herein and that the described embodiments are not limiting. The description should not be restricted to the above embodiments, but should be measured by the following claims.

We claim:
1. A brace for use in a building to resist earthquake and other forces applied to the building, the brace comprising:
  a core with a first and second longitudinal end and first and second lateral edges;
  a first flange orthogonally disposed to the first lateral edge of the core;

a second flange orthogonally disposed to the second lateral edge of the core, the first and second flanges each having a first and second longitudinal end surface;

an upper containment web disposed atop the core and a lower containment web disposed beneath the core, the upper and lower containment webs in contact with and extending longitudinally along the core and terminating short of the first and second longitudinal ends of the core, the upper and lower containment webs extending laterally across the core and secured to the first and second flanges wherein the core is capable of longitudinal translation between the upper and lower containment webs;

a slot within the upper and lower containment webs at each longitudinal end of the containment webs;

at least one core stiffener secured to and extending perpendicularly from the core through each slot in the containment web;

a first slope stiffener extending diagonally between the upper containment web and the first flange;

a second slope stiffener extending diagonally between the upper containment web and the second flange; and an endplate secured to the core and the at least one core stiffener.

2. The brace of claim 1, wherein the slot within the upper and lower containment webs extends longitudinally inward from the longitudinal end of the containment webs and terminates with a radius.

3. The brace of claim 1, wherein an end stiffener is disposed proximate the radius of the slot atop each of the upper and lower containment webs and spans between the first and second flanges.

4. The brace of claim 1, wherein a U-stiffener is disposed proximate each longitudinal end of the upper and lower containment webs, the U-stiffeners spanning between the first and second flanges and including a cutout portion to allow passage therethrough of the core stiffener.

5. The brace of claim 1, wherein the slope stiffeners further comprise a first longitudinal edge disposed parallel to the upper web and a second longitudinal edge disposed parallel to the first flange.

6. The brace of claim 1, wherein the slope stiffeners further comprise a first lateral edge disposed parallel to the end stiffener and a second lateral edge disposed parallel to the U-stiffener.

7. The brace of claim 5, wherein the first and second longitudinal edges of the slope stiffeners are welded respectively to the web member and the flanges.

8. The brace of claim 6, wherein the first and second lateral edges of the slope stiffeners are welded respectively to the end stiffener and the U-stiffener.

9. The brace of claim 1, wherein the slope stiffener extends diagonally between the web member and the flange at an angle in the range of from 35 to 50 degrees relative to the flange.

10. The brace of claim 1, wherein at least one core stiffener extends perpendicularly from the uncovered core segment and through the slot opening past the upper and lower containment webs.

11. The brace of claim 1, wherein the first and second flanges each have an upper and lower edge and a mid-line half-way between the upper and lower edges.

12. The brace of claim 1, wherein the core has an upper and a lower surface.

13. The brace of claim 12, wherein the core has a mid-line between the upper and lower surface.

14. The brace of claim 12, wherein the mid-line of the brace core is aligned with the mid-line of the first and second flanges.

15. The brace of claim 1, wherein the endplate includes at least one hole for securing with a bolt and a nut to a matching endplate that is secured to a gusset plate.

16. The brace of claim 1, wherein the core is comprised of Carbon steel Grade 55 or a lesser Grade.

17. A brace to restrain against buckling of the structural steel framework of a building, the brace comprising:

a core with a first and second longitudinal end and a first and second lateral edge;

a first flange plate disposed perpendicularly to the first lateral edge of the core;

a second flange plate disposed perpendicularly to the second lateral edge of the core, the first and second flange plates each having a first and second longitudinal end;

an upper containment web disposed atop the core and a lower containment web disposed beneath the core, the upper and lower containment webs extending longitudinally along the core and terminating short of the first and second longitudinal ends of the core creating an uncovered core segment at each longitudinal end, the upper and lower containment webs extending laterally across the core and secured to the first and second flange plates, wherein the core is capable of longitudinal translation relative to the upper and lower containment webs and the first and second longitudinal ends of the core are secured either to a building frame or to a gusset secured to a building frame.

18. The brace of claim 17, wherein a slot is disposed within the first and second webs at each longitudinal end of the containment webs.

19. The brace of claim 17, wherein at least one core stiffener is secured to and extending perpendicularly from the core through each slot in the upper and lower containment webs.

20. The brace of claim 17, wherein a first longitudinal edge of a pair of slope stiffeners extends longitudinally adjacent the slot in the upper containment web at each longitudinal end of the upper containment web.

21. The brace of claim 17, wherein a first longitudinal edge of a pair of slope stiffeners extends longitudinally adjacent the slot in the lower containment web at each longitudinal end of the lower containment web.

22. The brace of claim 17, wherein the at least one core stiffener extends perpendicular to the core and beyond the upper and lower containment webs.

23. The brace of claim 17, wherein the core terminates in at least one of 1) an endplate, 2) a core stiffener that extends outwardly beyond the longitudinal end of the core, or 3) a core stiffener that terminates at the longitudinal end of the core.

24. A method for fabricating a brace, the method comprising:

positioning two oppositely disposed longitudinally extending flanges in a vertical orientation, each flange being of substantially equal length and each with a first end and a second end and a longitudinal and lateral mid-line;

positioning a first web between the two flanges, wherein the first web includes a first longitudinal end and a second longitudinal end with a mid-line between the first and second longitudinal ends and slots disposed within the first and second ends;

aligning the longitudinal mid-line of the flanges with the mid-line of the first web;

welding the first web to the two flanges a predetermined distance below the lateral mid-lines of the flanges;

positioning a core with a thickness mid-line, first and second longitudinal ends and a top and bottom surface atop the first web wherein the thickness mid-line of the core is aligned with the lateral mid-line of the flanges, the core extending longitudinally beyond the first web;

positioning a second web atop the core, the second web having a longitudinal mid-line between the first and second ends and slots disposed within the first and second longitudinal ends;

aligning the longitudinal mid-line of the second web with the longitudinal mid-line of the core;

welding the second web to the oppositely disposed flanges; and welding a core stiffener with first and second longitudinal ends to the first and second ends of the top and bottom surfaces of the core, the core stiffeners extending upwardly through the slots in the first and second ends of the first and second horizontally disposed webs, the first end of each of the core stiffeners extending longitudinally outwardly and terminating in at least one of 1) an endplate secured to the first and second longitudinal ends of the core and the first longitudinal end of the core stiffener, the endplate in-turn being secured to a plate that is secured to a gusset or, 2) a core stiffener that extends outwardly beyond the longitudinal end of the core.

25. The method of claim 24, wherein a pair of slope stiffeners extend longitudinally along the slot in the second web at each longitudinal end of the second web.

26. The method of claim 24, wherein a pair of slope stiffeners extend longitudinally along the slot in the first web at each longitudinal end of the first web.

27. A system for bracing a building against buckling of the structural steel framework, the system comprising:

a first flange plate;

a second flange plate spaced apart and parallel to the first flange plate, the first and second flange plates each having a first and second longitudinal end with a mid-line between the first and second longitudinal ends and first and second lateral edges with a mid-line between the first and second lateral edges a core with a first and second longitudinal end, an upper and lower face, and a first and second lateral edge, the core extending longitudinally along the mid-line between the lateral edges of the first and second flange plates;

an upper web disposed atop the core and a lower web disposed beneath the core, the upper and lower webs extending longitudinally along the core and terminating short of the first and second longitudinal ends of the core creating an uncovered core segment at each longitudinal end, the upper and lower webs extending laterally across the core and secured to the first and second flange plates wherein the core is capable of longitudinal translation relative to the upper and lower webs;

a stiffener slot formed within the first and second longitudinal ends of the upper and lower containment webs to facilitate access to the upper and lower face of the core;

at least one core stiffener secured to and extending perpendicularly from the core through the core stiffener slot; and at least one of 1) an endplate secured to the longitudinal end surface of the core and the at least one core stiffener, the endplate in turn secured to a plate that is secured to a gusset, 2) a core stiffener that extends outwardly beyond the longitudinal end of the core for welded securement to a gusset, and 3) a core stiffener that terminates consistent with the longitudinal end of the core for welded securement to a building frame.

28. The system of claim 27, wherein at least one pair of slope stiffeners is positioned proximate the slots in the longitudinal ends of the upper and lower containment webs to enhance the capacity of the system for resisting externally applied forces.

29. The system of claim 27, wherein a pair of slope stiffeners extends longitudinally proximate the entire length of the slot in the upper and lower containment webs.

30. The system of claim 27, wherein at least one end stiffener is disposed between, and secured to the first and second flange plates proximate the uncovered core segment at each longitudinal end of the flange plates.

31. The system of claim 27, wherein at least one U-stiffener is disposed between, and secured to the first and second flange plates and spans the core stiffener slot at each longitudinal end of the flange plates.

* * * * *

UNITED STATES PATENT AND TRADEMARK OFFICE
CERTIFICATE OF CORRECTION

| | | |
|---|---|---|
| PATENT NO. | : 9,593,504 B2 | Page 1 of 1 |
| APPLICATION NO. | : 14/667181 | |
| DATED | : March 14, 2017 | |
| INVENTOR(S) | : Igor Marinovic and Clifton D. Hyder | |

It is certified that error appears in the above-identified patent and that said Letters Patent is hereby corrected as shown below:

In the Specification

Column 1, Line 64, insert a --.-- after "steel core" at the end of the sentence.

Column 4, Line 26, replace "U-Docket stiffeners" with --U-stiffeners--.

In the Claims

Claim 27, Column 9, Line 45, insert a --;-- after "lateral edges" at the end of the sentence.

Signed and Sealed this
Fourth Day of July, 2017

Joseph Matal
*Performing the Functions and Duties of the
Under Secretary of Commerce for Intellectual Property and
Director of the United States Patent and Trademark Office*